United States Patent
Tsou et al.

(10) Patent No.: US 12,018,205 B2
(45) Date of Patent: Jun. 25, 2024

(54) HIGHLY DISPERSIBLE METALLIC ACRYLATE COMPOSITION, PREPARATION METHOD THEREOF AND RESIN COMPOSITION CONTAINING THE SAME

(71) Applicant: SUNKO INK CO., LTD., Taichung (TW)

(72) Inventors: Chiu-Peng Tsou, Taichung (TW); Kuan-Jung Chiu, Taichung (TW); Zhen-Wei Chen, Taichung (TW); Ting-Ti Huang, Taichung (TW)

(73) Assignee: SUNKO INK CO., LTD., Taichung (TW)

( * ) Notice: Subject to any disclaimer, the term of this patent is extended or adjusted under 35 U.S.C. 154(b) by 901 days.

(21) Appl. No.: 17/076,779

(22) Filed: Oct. 21, 2020

(65) Prior Publication Data

US 2021/0403783 A1 Dec. 30, 2021

(30) Foreign Application Priority Data

Jun. 24, 2020 (TW) .................... 109121700

(51) Int. Cl.
| | | |
|---|---|---|
| *C09K 5/14* | (2006.01) | |
| *C08F 120/06* | (2006.01) | |
| *C08J 3/20* | (2006.01) | |
| *C08J 9/00* | (2006.01) | |
| *C08J 9/10* | (2006.01) | |
| *C08K 3/04* | (2006.01) | |
| *C08L 33/02* | (2006.01) | |

(52) U.S. Cl.
CPC .............. *C09K 5/14* (2013.01); *C08F 120/06* (2013.01); *C08J 3/203* (2013.01); *C08J 9/0066* (2013.01); *C08J 9/102* (2013.01); *C08J 9/105* (2013.01); *C08J 9/107* (2013.01); *C08K 3/04* (2013.01); *C08K 3/042* (2017.05); *C08L 33/02* (2013.01); *C08J 2203/04* (2013.01); *C08J 2333/02* (2013.01); *C08K 2201/001* (2013.01); *C08K 2201/011* (2013.01)

(58) Field of Classification Search
CPC ........ C08L 33/02; C08L 23/025; C08L 23/04; C08J 3/203; C08J 9/0066; C08J 9/102; C08J 9/105; C08J 9/107; C08J 2203/04; C08J 2333/02; C08K 3/042; C08K 3/04; C08K 2201/011; C08K 2201/001
See application file for complete search history.

(56) References Cited

U.S. PATENT DOCUMENTS

| | | |
|---|---|---|
| 5,789,616 A | 8/1998 | Kobayashi et al. |
| 6,278,010 B1 | 8/2001 | Tsou et al. |
| 6,720,364 B2 | 4/2004 | Sueda et al. |
| 7,217,829 B2 | 5/2007 | Hasegawa et al. |
| 10,550,259 B2 | 2/2020 | Tsou et al. |
| 10,709,937 B1 | 7/2020 | Jeon |
| 2005/0154089 A1* | 7/2005 | Taylor .................... C08G 59/40 524/394 |
| 2015/0031838 A1* | 1/2015 | Li ............................. C08J 9/122 525/274 |
| 2015/0315349 A1* | 11/2015 | Tippet ....................... C08K 5/14 525/190 |
| 2018/0002495 A1* | 1/2018 | Li ............................... C08J 3/22 |
| 2019/0390052 A1* | 12/2019 | Tsou ......................... C08F 4/52 |

FOREIGN PATENT DOCUMENTS

| | | | |
|---|---|---|---|
| CN | 102863824 A | 1/2013 | |
| CN | 109206820 A | 1/2019 | |
| CN | 110628095 A | 12/2019 | |
| CN | 110684244 A | 1/2020 | |
| CN | 110964231 A | 4/2020 | |
| EP | 1229076 A1 * | 8/2002 | ............. C08L 23/16 |
| JP | S58-14416 B2 | 3/1983 | |
| JP | H04-10463 B2 | 2/1992 | |
| JP | 4041175 B2 | 1/2008 | |
| JP | 4286018 B2 | 6/2009 | |
| JP | 4398157 B2 | 1/2010 | |
| TW | 530062 B | 5/2003 | |
| TW | 574296 B | 2/2004 | |
| TW | I530062 B | 4/2016 | |
| TW | I574296 B | 3/2017 | |
| TW | I647262 B | 1/2019 | |
| TW | I648097 B | 1/2019 | |

OTHER PUBLICATIONS

Machine translation CN 102863824 A to Liu et al. published Jan. 9, 2013 (Year: 2013).*
Lin et al. "The use of zinc dimethacrylate functionalized graphene as a reinforcement in rubber composites", Polym. Adv. Technol., 2015, 26, 423-431. Published online Mar. 8, 2015 (Year: 2015).*

(Continued)

*Primary Examiner* — Jane L Stanley
(74) *Attorney, Agent, or Firm* — PAI PATENT & TRADEMARK LAW FIRM; Chao-Chang David Pai

(57) ABSTRACT

The present invention provides a highly dispersible metallic acrylate composition containing specific content of a graphene, a flake graphite or a combination thereof as a thermally conductive powder, and thus has better stability and dispersivity, which leads to advantages of low adhesion to the metal surface and ease of mixing in resin. Moreover, the metallic acrylate composition can be applied to resin composition as an auxiliary crosslinking coagent for enhancing mechanical strength and good uniformity of cell dispersion in the foamed product, such that the foamed products can be used as architectural materials, materials of daily commodities, vehicle materials, damping and cushioning materials, packing materials, sport pad materials, or shoe materials.

19 Claims, 2 Drawing Sheets

(56) References Cited

OTHER PUBLICATIONS

Yuan et al. "Construction of multiple crosslinking networks in EPDM rubber: synergistic reinforcing effect of graphene-zinc dimethacrylate on EPDM and improvement mechanism of sealing resilience", Composites Part A, 121, 2019, 254-264. published online Mar. 26, 2019. (Year: 2019).*

* cited by examiner

HIGHLY DISPERSIBLE METALLIC ACRYLATE COMPOSITION, PREPARATION METHOD THEREOF AND RESIN COMPOSITION CONTAINING THE SAME

CROSS-REFERENCE TO RELATED APPLICATION

Pursuant to 35 U.S.C. § 119(a), this application claims the benefit of the priority to Taiwan Patent Application No. 109121700 filed Jun. 24, 2020. The content of the prior application is incorporated herein by its entirety.

BACKGROUND OF THE INVENTION

1. Field of the Invention

The present invention relates to a metallic crosslinking coagent composition applied in resins, and more particularly a highly dispersible metallic acrylate composition, a preparation method of the highly dispersible metallic acrylate composition, and a resin composition containing the highly dispersible metallic acrylate composition.

2. Description of the Prior Arts

Metallic acrylate, a common metallic crosslinking coagent, can be used for a rubber composition with a crosslinking agent during vulcanization, and can also be used as a modifier when synthesizing resin. The metallic acrylate can improve the hardness, compression and resilience of materials, increase the affinity between material and metal, enhance compatibility between materials, and improve mechanical strength, stretchability, heat resistance, abrasion resistance, solvent resistance, tear strength and metal adhesion of plastic materials. As a result, the metallic acrylate is widely added into plasticized molded products such as golf balls, rollers, sealing strips, cables, belts, construction materials and so on.

The structure of metallic acrylate is shown as follows:

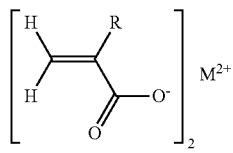

$M^{2+}$ is a divalent metal ion, and R is a hydrogen group (—H) or a saturated alkyl group.

Common metallic acrylates are, for example, zinc diacrylate (ZDA), calcium diacrylate, and magnesium dimethacrylate. The related commercial products include, for example, Dymalink 633, Dymalink 634, Dymalink 705 and Dymalink 706 sold by CRAY VALLEY; K-CURE 339, K-CURE 439, K-CURE 633 and K-CURE 634 sold by SUNKO INK; ZN-DA 90 and ZN-DA 100 sold by Nippon Shokubai Co., Ltd., and so on. For preparing methods of the metallic acrylate, please refer to, for example, TW 1530062, JP S58-14416, JP H4-10463, JP 4,041,175, JP 4,286,018, JP 4,398,157, U.S. Pat. Nos. 5,789,616, 6,278,010 and 7,217,829.

However, the metallic acrylate is prone to self-polymerization at high temperature and aggregation in the presence of moisture, resulting in aggregation and agglomeration caused by compaction after being deposited or stacked for a long period of time, especially more obvious for the metallic acrylate with a smaller particle size.

In general, when the metallic acrylate is agglomerated, it is less likely to be dispersed in the rubber, and the agglomerated metallic acrylate is prone to self-polymerization during the mixing due to frictional heating, thereby attaching more metallic acrylate. Besides, plate-out often occurs on the metal surface of the device and is difficult to remove, which results in white spots or flaws on the rubber surface once peeled off and affects the quality and appearance.

Besides, the self-polymerization of the metallic acrylate also affects the preparation of foamed elastomer. Specifically, the agglomerated metallic acrylate will make the degree of crosslinking uneven during preparation of the foamed elastomer, which leads to inconsistent sizes of foams, various wall thicknesses of foams, and air trap and foam-breaking, and further causes poor appearance and insufficient mechanical properties.

As disclosed by U.S. Pat. No. 6,720,364 and TW 1574296, polyolefin foaming composites containing zinc diacrylate or zinc dimethacrylate have to go through a second compression molding process to prevent surface foam-breaking and to achieve required mechanical strength. Nevertheless, the second compression molding process is often time-consuming and costly due to additional work.

As disclosed by TW 1648097 and U.S. Pat. No. 10,550,259, a polytetrafluoroethylene (PTFE) or a PTFE-modified polyethylene wax is used as a dispersant to improve the storage stability of the metallic acrylate. Besides, according to the disclosure of TW 1647262, the metallic acrylate containing PTFE or the PTFE-modified polyethylene wax is applied to a polyolefin foaming composition, and a foamed product with high rebound resilience and low compression set can be obtained without a second compression molding process.

However, none of the prior arts discloses how to prevent plate-out on the metal surface during transport of the metallic acrylate, and none of the prior arts mentions the effects of the metallic acrylate on the uniformity of cell dispersion in foamed products, either.

SUMMARY OF THE INVENTION

To overcome the aforementioned shortcomings, one objective of the present invention is to provide a highly dispersible metallic acrylate which has low adhesion to the metal surface of the device during transportation.

Another objective of the present invention is to provide a highly dispersible metallic acrylate which can be used in resin composition as a crosslinking coagent to enhance the mechanical strength of the resin composition, and also can be used to render the foamed products to have good uniformity of cell dispersion.

To achieve the aforementioned objectives, the present invention provides a metallic acrylate composition comprising a metallic acrylate having a structure represented by the following Formula (I):

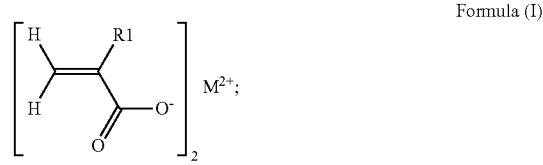

Formula (I)

wherein in Formula (I), $M^{2+}$ is zinc ion ($Zn^{2+}$), magnesium ion ($Mg^{2+}$) or calcium ion ($Ca^{2+}$); R1 is a hydrogen group or a saturated alkyl group having 1 to 6 carbon atoms; and a thermally conductive powder including a graphene, a flake graphite or a combination thereof; wherein the content of the thermally conductive powder ranges from 0.3 weight percent (wt %) to 25 wt % based on the total weight of the metallic acrylate composition.

By means of mixing the metallic acrylate and the specific content of the thermally conductive powder (graphene, flake graphite or combination thereof) in the metallic acrylate composition, the stability and dispersivity of the metallic acrylate are improved, such that the metallic acrylate composition can prevent self-agglomerate in long-term storage or transportation, has low adhesion to the metal surface of the device during transportation, and is easy to disperse in resin. Meanwhile, when the metallic acrylate composition is applied to a resin composition for a foamed product, the metallic acrylate composition not only enhances the mechanical strength but also exhibits good uniformity of cell dispersion in the foamed product.

In the present invention, the color index representing whiteness (WI) of the metallic acrylate composition is more than or equal to 20 and less than or equal to 70.

Preferably, the content of the thermally conductive powder ranges from 0.3 wt % to 8 wt % based on the total weight of the metallic acrylate composition; and the WI of the metallic acrylate composition is more than or equal to 30 and less than or equal to 70.

More preferably, the content of the thermally conductive powder ranges from 0.3 wt % to 2 wt % based on the total weight of the metallic acrylate composition; and the WI of the metallic acrylate composition is more than or equal to 45 and less than or equal to 70. By controlling the content of the thermally conductive powder in said specific range and further applying the thermal conductivity powder to resin compositions, the foamed products will have higher whiteness, lower yellowness and lower brightness, thereby providing good appearance and texture.

Preferably, the graphene includes a reduced graphene oxide (rGO) with carbon content more than 40% and 3 to 30 layers; the flake graphite includes a flake graphite with carbon content more than 95% and diameter D90 ranging from 5 micrometers (μm) to 30 μm. More preferably, the graphene includes a thin-layered reduced graphene oxide with carbon content more than 60%, 3 to 10 layers and ash value ranging from 0.1 wt % to 2.5 wt %, and a multiple-layered reduced graphene oxide with carbon content more than 60%, 10 to 20 layers and ash value ranging from 0.1 wt % to 2.5 wt %; the flake graphite includes a flake graphite with carbon content more than 98%, diameter D90 ranging from 10 μm to 25 μm and ash value ranging from 0.1 wt % to 1 wt %.

In the present invention, the metallic acrylate composition may selectively comprise an additive. For example, the additive may be, but is not limited to, an antioxidant, a retarder, a thermal stabilizer, a lubricant, a surfactant or a combination thereof.

Besides, the present invention also provides a preparation method of foresaid metallic acrylate composition, comprising the following steps:

step (a): reacting an acrylic acid, a divalent metal oxide and a thermally conductive powder in a nonpolar solvent at a temperature ranging from 30° C. to 100° C. to obtain a first mixture; and step (b): removing the nonpolar solvent of the first mixture to obtain the metallic acrylate composition; wherein the thermally conductive powder includes a graphene, a flake graphite or a combination thereof, and the content of the thermally conductive powder ranges from 0.3 wt % to 25 wt % based on the total weight of the metallic acrylate composition.

Preferably, the step (a) further comprises the following steps: step (a1): mixing the acrylic acid and the thermally conductive powder to obtain a second mixture; and step (a2): reacting the second mixture and the divalent metal oxide in the nonpolar solvent at the temperature ranging from 30° C. to 100° C. to obtain the first mixture.

Preferably, a molar ratio of the acrylic acid and the divalent metal oxide is 1.4:1 to 2.1:1. More preferably, a molar ratio of the acrylic acid and the divalent metal oxide is 1.85:1 to 2.05:1.

In the foresaid preparation method, the applicable examples of the acrylic acid may be, but are not limited to, 2-propenoic acid, 2-methylpropenoic acid, 2-ethylpropenoic acid, 2-propylpropenoic acid, 2-butylpropenoic acid, 2-pentylpropenoic acid, or 2-hexylpropenoic acid.

In the foresaid preparation method, the applicable examples of the divalent metal oxide may be, but are not limited to, zinc oxide, magnesium oxide, calcium oxide, zinc hydroxide, magnesium hydroxide, or calcium hydroxide.

In the foresaid preparation method, the graphene includes a reduced graphene oxide with carbon content more than 40% and 3 to 30 layers; the flake graphite includes a flake graphite with carbon content more than 95% and diameter D90 ranging from 5 μm to 30 μm. More preferably, the graphene includes a thin-layered reduced graphene oxide with carbon content more than 60%, 3 to 10 layers and ash value ranging from 0.1 wt % to 2.5 wt %, and a multiple-layered reduced graphene oxide with carbon content more than 60%, 10 to 20 layers and ash value ranging from 0.1 wt % to 2.5 wt %; the flake graphite includes a flake graphite with carbon content more than 98%, diameter D90 ranging from 10 μm to 25 μm and ash value ranging from 0.1 wt % to 1 wt %.

In the foresaid preparation method, the nonpolar solvent is a hydrocarbon solvent having a boiling point within 50° C. to 150° C. under atmospheric pressure. The applicable examples of the nonpolar solvent may be, but are not limited to, benzene, toluene, xylene, cyclohexane, hexane, heptane, or octane.

In the foresaid preparation method, an additive can be used depending on the demands in different applications. The applicable examples of the additive may be, but are not limited to, an antioxidant, a retarder, a thermal stabilizer, a lubricant, a surfactant or a combination thereof.

In the present invention, the content of the foresaid additive ranges from 0.02 wt % to 10 wt % based on the total weight of the metallic acrylate composition.

In the present invention, the foresaid antioxidant is used for inhibiting or preventing the oxidation of the elastomers or the reaction induced by oxygen radicals. For example, the antioxidant may be, but is not limited to, a quinoline-based antioxidant, an amine-based antioxidant, a phenol-based antioxidant, or a sulfur-based antioxidant. Specific examples of the antioxidant include, but are not limited to, N-phenyl-benzenamine reaction products with 2,4,4-trimethylpentene (CAS 68411-46-1), 2,6-di-tert-butyl-4-methyl-phenol, 2,2'-methylene-bis(6-tert-butyl-4-methylphenol), and 2-methyl-4,6-bis(octylsulfanylmethyl)phenol. The foresaid retarder is used for delaying scorch. For example, the retarder may be, but is not limited to, hydroquinone monomethylether, 2,6- di-tert-butyl-4-(dimethylaminomethyl)phenol, or 2,2,6,6-tetramethylpiperidinooxy. The foresaid thermal stabilizer is used for enhancing thermal stability. For example, the thermal stabilizer may be, but is not limited to, fatty acid metallic salt. The foresaid lubricant is used for decreasing friction heat of powder during transport. For example, the lubricant may be, but is not limited to, fatty acid, or low molecular weight polyethylene. The foresaid surfactant is used for improving the dispersion. For example, the surfactant may be, but is not limited to, polyoxyethylene alkyl ether, sorbitan fatty acid ester, polyoxyethylene sorbitan fatty acid ester, silicon oil, sodium alkylbenzensulfonate, or sodium dioctyl sulfosuccinate.

Besides, the present invention also provides a resin composition, comprising an unsaturated aliphatic polyolefin and the foresaid metallic acrylate composition.

Preferably, the amount of the metallic acrylate composition ranges from 0.1 parts by weight to 30 parts by weight per 100 parts by weight of the unsaturated aliphatic polyolefin. More preferably, the amount of the metallic acrylate composition ranges from 0.1 parts by weight to 5 parts by weight per 100 parts by weight of the unsaturated aliphatic polyolefin.

Preferably, the unsaturated aliphatic polyolefin is selected from the group consisting of: an ethylene propylene diene monomer rubber (EPDM), a polybutadiene rubber (BR), a butyl rubber (IIR), a natural rubber (NR), an isoprene rubber (IR), and a combination thereof. More preferably, the unsaturated aliphatic polyolefin is selected from the group consisting of: an ethylene propylene diene monomer rubber, a polybutadiene rubber, and any combination thereof.

Preferably, the resin composition may further comprise a copolymer, an organic peroxide, a foaming agent, an auxiliary agent or a combination thereof.

Preferably, the applicable copolymer includes an ethylene copolymer, an olefin block copolymer, or a combination thereof.

Preferably, the ethylene copolymer is selected from the group consisting of: an ethylene/vinyl acetate copolymer, an ethylene/octene copolymer, a polyethylene (PE), an ethylene/alpha-olefin copolymer, an ethylene/alpha-olefin non-conjugated diene copolymer, an ethylene/acrylic copolymer, an ethylene/methyl acrylic copolymer, an ethylene/methyl acrylate copolymer, an ethylene/methyl methacrylate copolymer, an ethylene/ethyl acrylate copolymer, an ethylene/ethyl methacrylate copolymer, an ethylene/butyl acrylate copolymer, an ethylene/butyl methacrylate copolymer, and any combination thereof. More preferably, the copolymer is selected from the group consisting of: an ethylene/vinyl acetate copolymer, an ethylene/octene copolymer, an olefin block copolymer and any combination thereof.

In the foresaid resin composition, a weight ratio between the copolymer and the unsaturated aliphatic polyolefin is 1:3 to 3:1.

Preferably, the applicable organic peroxide may be, but is not limited to, an alkyl hydroperoxide, a dialkyl hydroperoxide, an aromatic hydroperoxide, a peroxyester, a diperoxyketal, a diacyl peroxide, or a peroxydicarbonate.

More specifically, the foresaid alkyl hydroperoxide may be, but is not limited to, tert-butyl-hydroperoxide, tert-amyl-hydroperoxide, or 2,5-dimethyl-hexane-2,5-dihydroperoxide. The foresaid dialkyl hydroperoxide may be, but is not limited to, di-tert-butyl-hydroperoxide, di-tert-amyl-hydroperoxide, 2,5-bis(tert-butylperoxy)-2,5-dimethylhexane, or 2,5-dimethyl-2,5-di(tert-butylperoxy)-hexyne-3. The foresaid aromatic hydroperoxide may be, but is not limited to, dicumyl peroxide, benzoyl peroxide, cumene hydroperoxide, diisopropylbenzene hydroperoxide, tert-butyl peroxybenzoate, di(tert-butylperoxyisopropyl)benzene, or bis(4-methyl benzoyl)peroxide. The foresaid peroxyester may be, but is not limited to, tert-butyl peroxybenzoate, tert-amyl peroxybenzoate, tert-butyl peroxyacetate, tert-butyl monoperoxymaleate, tert-butyl peoxypivalate, tert-butyl peroxyneodecanoate, tert-amyl peroxyneodecanoate, tert-butyl peroxy-2-ethylhexanoate, tert-butyl peroxyisobutyrate, tert-butyl peroxyneoheptanoate, tert-butyl peroxy-3,5,5-trimethylhexanoate, tert-butyl peroxy-2-ethylhexyl carbonate, tert-amyl peroxy-2-ethylhexyl carbonate, or 2,5-dimethyl-2,5-di(2-ethylhexanoylperoxy)hexane. The foresaid diperoxyketal may be, but is not limited to, 3,6,9-triethyl-3,6,9-trimethyl-1,4,7-triperoxynonane, 1,1-bis(tert-butylperoxy)-3,3,5-trimethylcyclohexane, 1,1-bis(tert-butylperoxy) cyclohexane, or 2,2-di(tert-butylperoxy) butane. The foresaid diacyl peroxide may be, but is not limited to, benzoyl peroxide, bis(3,5,5-trimethyl-1-oxohexyl)peroxide, or dilauroyl peroxide. The foresaid peroxydicarbonate may be, but is not limited to, bis(2-ethylhexyl)peroxydicarbonate, bis(4-tert-butyl-cyclohexyl) peroxydicarbonate, dimyrityl peroxyldicarbonate, or dicetyl peroxyducarbonate.

Preferably, the applicable foaming agent may be, but is not limited to, an azo compound, a nitroso compound, or a sulfonyl hydrazine compound. Specifically, the azo compound may be, but is not limited to, azodicarbonamide, azodicarboxylicamide, azodiisobutyronitrile, diisopropyl azodicarboxylate, diethyl azodicarboxylate, aminoazobenzene, or barium azodicarboxylate; the nitroso compound may be, but is not limited to, N,N'-dinitrosopentamethylene tetramine or N,N'-dimethyl-N,N'-dinitroso terephthalamide; and the sulfonyl hydrazine compound may be, but is not limited to, 4,4'-bis(sulfonylhydrazine)diphenyl ether, p-toluensulfonyl hydrazide, diphenylsulfone-3,3'-disulfonyl hydrazide, 4,4'-diphenyl disulfonamide, 1,3-benzenedisulfonyl hydrazide, or 1,4-benzenedisulfonyl hydrazide.

In the present invention, the applicable auxiliary agent may be, but is not limited to, a fatty acid having 12 to 20 carbon atoms, a fatty acid metallic salt (such as zinc stearate, calcium stearate, or barium stearate), a polyethylene wax, zinc oxide, urea, a talcum powder, calcium carbonate, titanium dioxide, a kaolinite, a carbon black, a pigment, a stabilizer, an curing coagent having vinyl group (such as triallyl cyanurate, triallyl isocyanurate, divinylbenzene, triallyl phosphate), or a combination thereof.

Besides, the present invention also provides a polyolefin elastomer prepared from the foresaid resin composition. Specifically, the polyolefin elastomer is made from the resin composition by thermal vulcanization with any conventional processing methods. For example, the processing method may be, but is not limited to, thermoforming, injection molding, or extrusion molding.

Preferably, the ultimate tensile strength of the polyolefin elastomer is more than or equal to 110 kgf/cm$^2$ and less than or equal to 160 kgf/cm$^2$. More preferably, the ultimate tensile strength of the polyolefin elastomer is more than or equal to 115 kgf/cm$^2$ and less than or equal to 140 kgf/cm$^2$.

Preferably, the tear strength of the polyolefin elastomer is more than or equal to 25 kgf/cm and less than or equal to 50 kgf/cm. More preferably, the tear strength of the polyolefin elastomer is more than or equal to 30 kgf/cm and less than or equal to 45 kgf/cm.

Preferably, the compression set of the polyolefin elastomer is more than or equal to 10% and less than or equal to 30%.

Besides, the present invention also provides a foamed elastomer prepared from the foresaid resin composition. Specifically, the foamed elastomer is made from the resin composition by any conventional foaming process methods. For example, the foaming process may be, but is not limited to, compression molding foaming, in-mold foaming, or injection molding foaming.

Preferably, the ultimate tensile strength of the foamed elastomer is more than or equal to 10 kgf/cm$^2$ and less than or equal to 25 kgf/cm$^2$. More preferably, the ultimate tensile strength of the foamed elastomer is more than or equal to 17 kgf/cm$^2$ and less than or equal to 25 kgf/cm$^2$.

Preferably, the tear strength of the foamed elastomer is more than or equal to 5 kgf/cm and less than or equal to 15 kgf/cm. More preferably, the tear strength of the foamed elastomer is more than or equal to 9.7 kgf/cm and less than or equal to 15 kgf/cm.

Preferably, the compression set of the foamed elastomer is more than or equal to 10% and less than or equal to 40%. More preferably, the compression set of the foamed elastomer is more than or equal to 10% and less than or equal to 35%.

Preferably, the WI of the foamed elastomer is more than or equal to 20 and less than or equal to 70; the color index representing yellowness (YI) of the foamed elastomer is more than or equal to −2 and less than or equal to 16; and the color index representing brightness (L*) of the foamed elastomer is more than or equal to 45 and less than or equal to 85. More preferably, the WI of the foamed elastomer is more than or equal to 40 and less than or equal to 70; the YI of the foamed elastomer is more than or equal to 1 and less than or equal to 11; and the L* of the foamed elastomer is more than or equal to 70 and less than or equal to 85.

In the present invention, the foamed elastomer has good uniformity of cell dispersion and mechanical strength, and thus can be broadly applied in many fields, such as architectural materials, vehicle materials, damping materials, cushioning materials, packing materials, sport pad materials, or shoe materials.

Other objectives, advantages and novel features of the invention will become more apparent from the following detailed description when taken in conjunction with the accompanying drawings.

DETAILED DESCRIPTION OF THE PREFERRED EMBODIMENTS

Figure 1A:
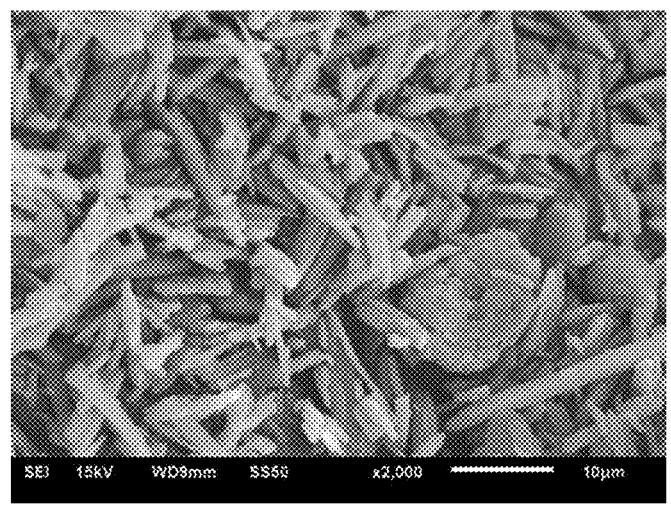
FIG. 1A is a photograph taken with filed-emission scanning electron microscope (FE-SEM) of the metallic acrylate composition of Example 2.

Hereinafter, one skilled in the arts can easily realize the advantages and effects of the present invention from the following examples. The descriptions proposed herein are just preferable embodiments for the purpose of illustrations only, not intended to limit the scope of the invention. Various modifications and variations could be made in order to practice or apply the present invention without departing from the spirit and scope of the invention.

Metallic Acrylate Composition

The properties of the metallic acrylate composition of the following Examples were demonstrated with the assay of zinc acrylate, the ash value, the content of thermally conductive powder, the color index and the particle size. Said physical and chemical properties were determined by the method described as follows.

1. Assay of Zinc Acrylate

The assay of zinc acrylate was determined by oxidation-reduction titration through analyzing the content of double bond in order to calculate the percentage of the assay of zinc acrylate in the sample (unit: %).

2. Ash Value 1 gram of precisely weighed sample, as initial weight W0, was placed in the furnace and heated to 600±25° C. for 3 hours to observe the color of the sample. The sample was placed back into the furnace and heated to 800±25° C. for 2 hours until off-white ash was obtained. The off-white ash was moved into the desiccator and cooled down to room temperature, and then weighed and its residue weight W1 was recorded. The ash value was calculated by the calculation: [(W0−W1)/W0]×100% (unit: %).

3. Content of Thermally Conductive Powder

The content of thermally conductive powder represents the content of graphene, flake graphite or combination thereof in the metallic acrylate composition, which can be determined by dividing the weight of used graphene, flake graphite or combination thereof by the total weight of the metallic acrylate composition, and expressed in percentage (unit: %).

4. Color Index

HunterLab ColorFlex® EZ was used to measure the whiteness and the yellowness of the sample for three times, and the measured results were averaged to obtain average whiteness (WI) and average yellowness (YI).

5. Particle Size

Beckman Coulter® LS 13 320/ISO 13320-1 was used with micro module to analyze the particle size of sample. Sample (2 milligram for the thermally conductive powder; and 0.15 gram for the metallic acrylate composition) was added in 100 mL ethanol, and dispersed by ultrasonicator for one minute. Afterward, the solution was placed in a container of micro module until the opacity reached 10% for analyzing. The particle size of 90% particles (i.e., diameter D90) and the particle size of 50% of particles (i.e., diameter D50) were recorded. Each sample was analyzed for three times and the measured results were averaged and counted according to particle volume (unit: μm).

Example 1

5.83 grams of graphene (multiple-layered reduced graphene oxide purchased from Angstron materials (Asia) Inc. and having carbon content more than 99%, ash value less than or equal to 0.5 wt % and 10 to 20 layers) was adopted as the thermally conductive powder and mixed with 1048 grams (14.55 mole) of acrylic acid (purchased from Formosa Plastics Corporation and containing 200±20 parts per million (ppm) of hydroquinone monomethylether) to obtain the second mixture.

A stainless steel reactor of 6 L was charged with 2000 mL of toluene, 586.4 grams (7.24 mole) of zinc oxide, 102.3 grams (0.36 mole) of stearic acid and 4.8 grams of nonionic surfactant Sinopol 1807, and then added with the second mixture while heated to 50±5° C. and stirred at the temperature ranging from 50° C. to 80° C. for 2 hours to obtain the first mixture.

The first mixture was subjected to vacuum distillation to remove about 129 mL of water therefrom and meanwhile recycle the toluene. Afterward, the first mixture was kept drying until the moisture content of the first mixture was less than 2000 ppm, and then cooled to room temperature to obtain a crude product. The crude product was placed into a pulverizer (RT-25) to obtain 1587 grams of powdered product, and the powdered product is the zinc acrylate composition of Example 1.

By means of the abovementioned methods, the properties of the zinc acrylate composition of Example 1 were determined as follows: the assay of zinc acrylate: 92.3%; the ash value: 36.7%; the particle size: diameter D50 being 6.42 μm and diameter D90 being 21.0 μm; the color index: the WI being 65.5 and the YI being −1.8; and the content of the thermally conductive powder: 0.367%.

Example 2

The preparation method of Example 2 is similar to Example 1. The main difference between Example 2 and Example 1 is that in Example 2, 12.19 grams of graphene (multiple-layered reduced graphene oxide purchased from Angstron materials (Asia) Inc. and having carbon content more than 99%, ash value less than or equal to 0.5 wt % and 10 to 20 layers) was adopted as the thermally conductive powder, and 1577 grams of zinc acrylate composition of Example 2 was obtained.

By means of the abovementioned methods, the properties of the zinc acrylate composition of Example 2 were determined as follows: the assay of zinc acrylate: 91.2%; the ash value: 36.8%; the particle size: diameter D50 being 5.66 μm and diameter D90 being 17.9 μm; the color index: the WI being 55.0 and the YI being −2.0; and the content of the thermally conductive powder: 0.773%.

Example 3

The preparation method of Example 3 is similar to Example 1. The main difference between Example 3 and Example 1 is that in Example 3, 24.57 grams of graphene (multiple-layered reduced graphene oxide purchased from Angstron materials (Asia) Inc. and having carbon content more than 99%, ash value less than or equal to 0.5 wt % and 10 to 20 layers) was adopted as the thermally conductive powder, and 1600 grams of zinc acrylate composition of Example 3 was obtained.

By means of the abovementioned methods, the properties of the zinc acrylate composition of Example 3 were determined as follows: the assay of zinc acrylate: 91.8%; the ash value: 36.8%; the particle size: diameter D50 being 7.41 μm and diameter D90 being 20.8 μm; the color index: the WI being 50.8 and the YI being −2.5; and the content of the thermally conductive powder: 1.54%.

Example 4

The preparation method of Example 4 is similar to Example 1. The main difference between Example 4 and Example 1 is that in Example 4, 32.92 grams of graphene (multiple-layered reduced graphene oxide purchased from Angstron materials (Asia) Inc. and having carbon content more than 99%, ash value less than or equal to 0.5 wt % and 10 to 20 layers) was adopted as the thermally conductive powder, and 1605 grams of zinc acrylate composition of Example 4 was obtained.

By means of the abovementioned methods, the properties of the zinc acrylate composition of Example 4 were determined as follows: the assay of zinc acrylate: 90.4%; the ash value: 36.2%; the particle size: diameter D50 being 7.47 μm and diameter D90 being 22.6 μm; the color index: the WI being 49.6 and the YI being −3.0; and the content of the thermally conductive powder: 2.05%.

Example 5

The preparation method of Example 5 is similar to Example 1. The main difference between Example 5 and Example 1 is that in Example 5, 139.3 grams of graphene (multiple-layered reduced graphene oxide purchased from Angstron materials (Asia) Inc. and having carbon content more than 99%, ash value less than or equal to 0.5 wt % and 10 to 20 layers) was adopted as the thermally conductive powder, and 1752 grams of zinc acrylate composition of Example 5 was obtained.

By means of the abovementioned methods, the properties of the zinc acrylate composition of Example 5 were determined as follows: the assay of zinc acrylate: 86.9%; the ash value: 36.8%; the particle size: diameter D50 being 8.43 μm and diameter D90 being 20.7 μm; the color index: the WI being 33.0 and the YI being −2.9; and the content of the thermally conductive powder: 7.95%.

Example 6

5.83 grams of graphene (thin-layered reduced graphene oxide purchased from Angstron materials (Asia) Inc. and having carbon content ranging from 60% to 80%, ash value less than or equal to 2.5 wt % and 3 to 10 layers) was adopted as the thermally conductive powder and placed in a 6 L stainless steel reactor, and then added with 2000 mL of toluene, 1048 grams (14.55 mole) of acrylic acid, 586.4 grams (7.24 mole) of zinc oxide, 102.3 grams (0.36 mole) of stearic acid and 4.8 grams of silicone oil. Then, the solution was heated to 50±5° C. and stirred at the temperature ranging from 50° C. to 80° C. for 2 hours to obtain the first mixture.

The first mixture was subjected to vacuum distillation to remove about 129 mL of water therefrom and meanwhile recycle the toluene. Afterward, the first mixture was kept drying until the moisture content of the first mixture was less than 2000 ppm, and then cooled to room temperature to obtain a crude product. The crude product was placed into a pulverizer (RT-25) to obtain 1587 grams of powdered product, and the powdered product is the zinc acrylate composition of Example 6.

By means of the abovementioned methods, the properties of the zinc acrylate composition of Example 6 were determined as follows: the assay of zinc acrylate: 92.3%; the ash value: 36.7%; the particle size: diameter D50 being 7.85 μm and diameter D90 being 20.3 μm; the color index: the WI being 59.4 and the YI being −1.3; and the content of the thermally conductive powder: 0.367%.

Example 7

The preparation method of Example 7 is similar to Example 6. The main difference between Example 7 and Example 6 is that in Example 7, 12.19 grams of graphene (multiple-layered reduced graphene oxide purchased from Angstron materials (Asia) Inc. and having carbon content more than 99%, ash value less than or equal to 0.5 wt % and 10 to 20 layers) was adopted as the thermally conductive powder, and 1624 grams of zinc acrylate composition of Example 7 was obtained.

By means of the abovementioned methods, the properties of the zinc acrylate composition of Example 7 were determined as follows: the assay of zinc acrylate: 91.65%; the ash value: 37.2%; the particle size: diameter D50 being 10.1 μm and diameter D90 being 22.7 μm; the color index: the WI being 64.46 and the YI being −2.37; and the content of the thermally conductive powder: 0.751%.

Example 8

The preparation method of Example 8 is similar to Example 6. The main difference between Example 8 and Example 6 is that in Example 8, 12.19 grams of flake graphite (flake graphite purchased from Qingdao Tianheda Graphite Co., Ltd. and having carbon content 99.48%, ash value 0.52 wt % and diameter D90 being 12.27 μm) was adopted as the thermally conductive powder, and 1626 grams of zinc acrylate composition of Example 8 was obtained.

By means of the abovementioned methods, the properties of the zinc acrylate composition of Example 8 were determined as follows: the assay of zinc acrylate: 91.39%; the ash value: 37.13%; the particle size: diameter D50 being 18 μm and diameter D90 being 29.8 μm; the color index: the WI being 61.12 and the YI being −2.29; and the content of the thermally conductive powder: 0.750%.

Example 9

The preparation method of Example 9 is similar to Example 6. The main difference between Example 9 and Example 6 is that in Example 9, 403.3 grams of graphene (multiple-layered reduced graphene oxide purchased from Angstron materials (Asia) Inc. and having carbon content more than 99%, ash value less than or equal to 0.5 wt % and 10 to 20 layers) was adopted as the thermally conductive powder, and 1936 grams of zinc acrylate composition of Example 9 was obtained.

By means of the abovementioned methods, the properties of the zinc acrylate composition of Example 9 were determined as follows: the assay of zinc acrylate: 78.9%; the ash value: 34.6%; the particle size: diameter D50 being 8.64 μm and diameter D90 being 23.9 μm; the color index: the WI being 25.8 and the YI being −2.75; and the content of the thermally conductive powder: 20.8%.

Example 10

13.3 grams of graphene (multiple-layered reduced graphene oxide purchased from Angstron materials (Asia) Inc. having carbon content more than 99%, ash value less than or equal to 0.5 wt % and 10 to 20 layers) was adopted as the thermally conductive powder and placed in a 6 L stainless steel reactor, and then added with 2000 mL of cyclohexane, 1252 grams (14.55 mole) of methacrylic acid, 586.4 grams (7.24 mole) of zinc oxide and 4.8 grams of silicone oil. Then, the solution was heated to 50±5° C. and stirred at the temperature ranging from 50° C. to 80° C. for 2 hours to obtain the first mixture.

The first mixture was subjected to vacuum distillation to remove about 129 mL of water therefrom and meanwhile recycle the cyclohexane. Afterward, the first mixture was kept drying until the moisture content of the first mixture was less than 2000 ppm, and then cooled to room temperature to obtain a crude product. The crude product was placed into a pulverizer (RT-25) to obtain 1794 grams of powdered product, and the powdered product is the zinc methacrylate composition of Example 10.

By means of the abovementioned methods, the properties of the zinc methacrylate composition of Example 10 were determined as follows: the assay of zinc methacrylate: 96.14%; the ash value: 31.65%; the particle size: diameter D50 being 8.7 μm and diameter D90 being 24.6 μm; the color index: the WI being 49.28 and the YI being 4.14; and the content of the thermally conductive powder: 0.74%.

Comparative Example 1

A stainless steel reactor of 6 L was charged with 2000 mL of toluene, 1048 grams (14.55 mole) of acrylic acid, 586.4 grams (7.24 mole) of zinc oxide, 102.3 grams (0.36 mole) of stearic acid and 4.8 grams of silicone oil, and then heated to 50±5° C. and stirred at the temperature ranging from 50° C. to 80° C. for 2 hours to obtain a mixture.

The mixture was subjected to vacuum distillation to remove about 129 mL of water therefrom and meanwhile recycle the toluene. Afterward, the mixture was kept drying until the moisture content of the mixture was less than 2000 ppm, and then cooled to room temperature to obtain a crude product. The crude product was placed into a pulverizer (RT-25) to obtain 1581 grams of powdered product, and the powdered product is the zinc acrylate composition of Comparative Example 1.

By means of the abovementioned methods, the properties of the zinc acrylate composition of Comparative Example 1 were determined as follows: the assay of zinc acrylate: 91.6%; the ash value: 36.0%; the particle size: diameter D50 being 7.55 μm and diameter D90 being 20.1 μm; and the color index: the WI being 91.6 and the YI being −0.27.

Comparative Example 2

A stainless steel reactor of 6 L was charged with 2000 mL of cyclohexane, 1252 grams (14.55 mole) of methacrylic acid, 586.4 grams (7.24 mole) of zinc oxide and 4.8 grams of silicone oil, and then heated to 50±5° C. and stirred at the temperature ranging from 50° C. to 80° C. for 2 hours to obtain a mixture.

The mixture was subjected to vacuum distillation to remove about 129 mL of water therefrom and meanwhile recycle the cyclohexane. Afterward, the mixture was kept drying until the moisture content of the mixture was less than 2000 ppm, and then cooled to room temperature to obtain a crude product. The crude product was placed into a pulverizer (RT-25) to obtain 1788.9 grams of powdered product, and the powdered product is the zinc methacrylate composition of Comparative Example 2.

By means of the abovementioned methods, the properties of the zinc methacrylate composition of Comparative Example 2 were determined as follows: the assay of zinc methacrylate: 97.65%; the ash value: 32.36%; the particle size: diameter D50 being 7.8 μm and diameter D90 being 37.9 μm; and the color index: the WI being 89.85 and the YI being 1.95.

According to the preparation methods of Examples 1 to 10 and Comparative Examples 1 to 2, the main difference between Examples and Comparative Examples is whether graphene or flake graphite was used as the thermally conductive powder during the preparation of the metallic acrylate composition. The differences of the thermally conductive powder of each Example and Comparative Example are listed in Table 1.

TABLE 1 the comparison of the thermally conductive powder contained in the zinc acrylate composition of Examples 1 to 10 and Comparative Examples 1 to 2.

| Metallic acrylate composition | Thermally conductive powder | |
|---|---|---|
| | Content (wt %) | Species |
| Example 1 | 0.367 | Multiple-layered reduced graphene oxide with carbon content more than 99% and 10 to 20 layers |
| Example 2 | 0.773 | |
| Example 3 | 1.54 | |
| Example 4 | 2.05 | |
| Example 5 | 7.95 | |
| Example 6 | 0.367 | Thin-layered reduced graphene oxide with carbon content ranging from 60% to 80% and 3 to 10 layers |
| Example 7 | 0.751 | Multiple-layered reduced graphene oxide with carbon content more than 99% and 10 to 20 layers |
| Example 8 | 0.75 | Flake graphite with carbon content 99.48% |
| Example 9 | 20.8 | Multiple-layered reduced graphene oxide with carbon content more than 99% and 10 to 20 layers |
| Example 10 | 0.74 | Multiple-layered reduced graphene oxide with carbon content more than 99% and 10 to 20 layers |
| Comparative Example 1 | — | |
| Comparative Example 2 | — | |

In order to demonstrate that the metallic acrylate composition of the present invention has better stability, dispersivity and anti-adhesion property during storage or transportation, the following Test Example 1 shows the results of simulating the compaction of the metallic acrylate composition during storage or transportation; Test Example 2 shows the microstructure and configuration of the metallic acrylate composition for evaluating the dispersivity; Test Example 3 simulates the transporting of the metallic acrylate composition in the device, and shows the adhesion of the metallic acrylate composition to the metal surface of the device after transportation; Test Example 4 shows the thermal conductivity of the metallic acrylate composition; and Test Example 5 shows the dispersivity of the thermally conductive powder in the metallic acrylate composition with optical microscope.

Test Example 1: Compaction Test of the Metallic Acrylate Composition

The zinc acrylate composition of Examples 2, 8 and 9 and Comparative Example 1 were adopted for Test Example 1. Specifically, three packs of 100 grams of samples from the foresaid groups were separately put into an aluminum foil bag having a size of 10 cm×10 cm, and the air in the aluminum foil bags was exhausted and then the bags were sealed by heat. Afterward, a 4-kilogram flange was placed on each of the heat-sealed aluminum foil bags, and then placed in a 50° C. oven, so as to simulate the weight and temperature conditions that the metallic acrylate composition may encounter during the storage or transportation. The test time of Test Example 1 is in units of months, and the appearance of each group after compaction test for one month, two months and three months is recorded in Table 2.

TABLE 2 the appearances of the metallic acrylate composition of Examples 2, 8 and 9 and Comparative Example 1 after the compaction test for one month, two months and three months.

| Zinc acrylate composition | After one month of compaction | After two months of compaction | After three months of compaction |
|---|---|---|---|
| Example 2 | Powder without agglomeration | Partially agglomerated into small caking, but easy to crush | Partially agglomerated into small caking, but easy to crush |
| Example 8 | Powder without agglomeration | Partially agglomerated into small caking, but easy to crush | Partially agglomerated into small caking, but easy to crush |
| Example 9 | Powder without agglomeration | Powder without agglomeration | Powder without agglomeration |
| Comparative Example 1 | Partially agglomerated into small caking, but easy to crush | Partially agglomerated into small caking | Partially agglomerated into small caking |

According to the results in Table 2, in comparison to Comparative Example 1, the zinc acrylate compositions of Examples 2, 8 and 9 contain the thermally conductive powder, which leads to better stability and dispersivity. Besides, the zinc acrylate composition of Example 9 contains the highest content of the thermally conductive powder (20.8 wt %) and thus shows no agglomeration of the appearance even after three months of compaction.

Test Example 2: Microstructure and Configuration of the Metallic Acrylate Composition FE-SEM (Model: JOEL JSM-6700F) was used to observe the microstructure and configuration of the zinc acrylate compositions of Example 2 and Comparative Example 1 under 2000-fold amplification, and then microscope images were acquired and shown in FIG. 1A and FIG. 1B.

Figure 1B:
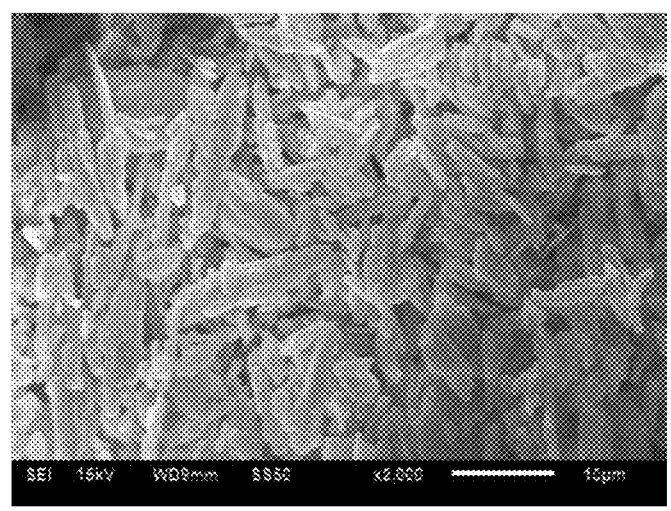
FIG. 1B is a photograph taken with FE-SEM of the metallic acrylate composition of Comparative Example 1.

According to FIG. 1A and FIG. 1B, the border of each of the zinc acrylate compositions of Example 2 was clear and no obvious agglomeration was observed. In contrast, little agglomeration of the zinc acrylate composition of Comparative Example 1 was observed. That is, in comparison to Comparative Example 1, the zinc acrylate composition of Example 2 indeed had better dispersivity.

Test Example 3: Adhesion of the Metallic Acrylate Composition to the Metal Surface The zinc acrylate composition of Example 2 and Comparative Example 1 were placed in a 50° C. oven for three hours and then cooled to room temperature. After that, 100 grams of zinc acrylate compositions of Example 2 and Comparative Example 1 were put into a two-axis screw feeder to perform the process of transportation. After the transportation, the degree of adhesion of the zinc acrylate composition to the metal surface was observed, and the zinc acrylate composition remaining on the metal surface was collected and weighted for evaluating the adhesion of the zinc acrylate composition to the metal surface.

The weight of the zinc acrylate composition of Example 2 remaining on the metal surface was 2.92 grams; and the weight of the zinc acrylate composition of Comparative Example 1 remaining on the metal surface was 10.23 grams. That is, the zinc acrylate composition of Example 2 almost had no adhesion to the metal surface and thus showed little amount of residue while the zinc acrylate composition of Comparative Example 1 had obvious high adhesion to the metal surface and thus showed large amount of residue. Therefore, in comparison to Comparative Example 1, the zinc acrylate composition of Example 2 indeed had low adhesion to the metal surface and could prevent large amount of residue on the metal surface.

Test Example 4: Thermal Conductivity of the Metallic Acrylate Composition

Multiple-layered reduced graphene oxide, purchased from Angstron materials (Asia) Inc. having carbon content more than 99% and 10 to 20 layers, the zinc acrylate composition of Example 5 and the zinc acrylate composition of Comparative Example 1 were adopted as samples of Test Example 4, and Hot Disk (Brand: Techmark Precision Instrument Co., Ltd.; Model: TPS3500) was used to measure thermal conductivity according to the standard ISO-DIS22007-2.2. Specifically, foresaid samples were pressed into ingot shaped and then placed in the Hot Disk for measuring thermal conductivity, and the results were listed in Table 3.

TABLE 3 the thermal conductivity of the multiple-layered reduced graphene oxide, the zinc acrylate composition of Example 5 and the zinc acrylate composition of Comparative Example 1.

| Samples | Content of the thermally conductive powder (wt %) | Thermal conductivity (W/mK) |
| --- | --- | --- |
| Comparative Example 1 | 0 | 0.2685 |
| Example 5 | 7.95 | 0.6607 |
| Multiple-layered reduced graphene oxide | 100 | 7.465 |

According to Table 3, in comparison to Comparative Example 1 (the zinc acrylate composition without thermally conductive powder), the zinc acrylate composition of Example 5 had specific content of the thermally conductive powder (graphene), so as to enhance the thermal conductivity for 2.5 times than Comparative Example 1 and close to the thermal conductivity of the multiple-layered reduced graphene oxide.

Test Example 5: Dispersivity of the Thermally Conductive Powder in the Metallic Acrylate Composition Multiple-layered reduced graphene oxide, purchased from Angstron materials (Asia) Inc. having carbon content more than 99% and 10 to 20 layers, the zinc acrylate composition of Example 2 and the zinc acrylate composition of Comparative Example 1 with additional foresaid multiple-layered reduced graphene oxide were adopted as samples of Test Example 5. Test Example 5 had the following two methods for evaluating the dispersivity. In method (1), 6 milligrams of foresaid samples were mixed with 250 milligrams of silicone oil and then observed with an optical microscope. Then, upon condition as max light intensity of the optical microscope, top five diameters of observed black flakes (aggregates of the thermally conductive powder) were recorded and averaged. In method (2), foresaid samples were dispersed in ethanol by ultrasonicator for one minute, and then laser particle size analyzer was used to record diameter D90 and diameter D50. The results of method (1) and method (2) were listed in Table 4.

TABLE 4 the results of dispersivity of the multiple-layered reduced graphene oxide, the zinc acrylate composition of Example 2 and the zinc acrylate composition of Comparative Example 1 with additional foresaid multiple-layered reduced graphene oxide.

| Samples | Content of the thermally conductive powder (wt %) | Method (1) Diameters of top five black flakes (μm) Averaged diameter of black flakes (μm) | Method (2) Diameter D90 (μm) Diameter D50 (μm) |
| --- | --- | --- | --- |
| Multiple-layered reduced graphene oxide | 100 | 57, 54, 38, 38, 36 45 | 26.0 9.44 |
| Comparative Example 1 with additional foresaid multiple-layered reduced graphene oxide | 0.750 | 48, 36, 31, 30, 28 35 | 21.0 6.41 |
| Example 2 | 0.773 | 24, 19, 17, 16, 15 18 | 17.9 5.66 |

According to Table 4, for the results of method (1), Example 2 showed the lowest averaged diameter of black flakes (i.e. the smallest size of the aggregates of the thermally conductive powder), representing better dispersivity of the thermally conductive powder of Example 2. Besides, the results of the diameters of top five black flakes of Example 2 also demonstrated that Example 2 had lower diameters of black flakes and the diameters among the black flakes were close to each other, which also showed better dispersivity of the thermally conductive powder of Example 2. As for the results of method (2), Example 2 still showed the lowest diameter D90 and diameter D50, which also can demonstrate better dispersivity of the thermally conductive powder of Example 2.

Resin Composition

Foresaid metallic acrylate composition was further applied to resin composition, and then resin compositions with or without the foresaid metallic acrylate composition were compared to demonstrate the different properties on the hardness, the density, the ultimate tensile strength, the elongation at break, the tear strength, the compression set, the rebound resilience and the color index. Said properties were determined by the method described as follows.

1. Hardness

According to the standard D2240 established by American Society for Testing and Materials (ASTM), the sample was cut into a round or square specimen with a thickness of 6 mm at least. The lateral dimensions of the specimen shall be sufficient to permit measurements at least 12 mm from any edge. The specimen of polyolefin elastomer was measured by a Shore A hardness tester (Brand: TECLOCK; Model: GS-709N); and the specimen of foamed elastomer is measured by a Shore C hardness tester (Brand: TECLOCK; Model: GS-701N TYPE C). With temperature at 23±2° C., each example was measured by hand holding the hardness tester for five times and the readout time for the hardness value is one second. The average of the five measured hardness values represented the hardness of the samples.

2. Density

According to the standard D792 established by ASTM, the sample was cut into a specimen sized 3 cm×2.5 cm×1 cm and placed in an environment at 23±2° C. under a humidity of 50±10% for at least 40 hours. Then, the specimen was weighted three times by an electronic balance (Brand: Percisa; Model: 125A SCS) at 23±2° C. The density was calculated based on the average of the three values measured by the electronic balance (unit: g/cm$^3$).

3. Ultimate Tensile Strength

According to the standard D412 established by ASTM, the sample was cut into a specimen by cutting Die C and placed in a tensile strength testing machine (Brand: Gotech Testing Machines Inc.; Model: AI-7000S) at 23±2° C. for testing at a rate of 500±50 mm/minute. After three times of testing, the ultimate tensile strength was calculated based on the average of the three measured values (unit: kgf/cm$^2$).

4. Elongation at Break

According to the standard D412 established by ASTM, the sample was cut into a specimen by cutting Die C and placed in a tensile strength testing machine (Brand: Gotech Testing Machines Inc.; Model: AI-7000S) at 23±2° C. for testing at a rate of 500±50 mm/minute. After three times of testing, the elongation at break was calculated based on the average of the three measured values (unit: %).

5. Tear Strength

According to the standard D624 established by ASTM, the sample was cut into a specimen with a thickness of 1 cm by cutting Die C. The specimen is measured in a tensile strength testing machine (Brand: Gotech Testing Machines Inc.; Model: AI-7000S) at 23±2° C. at a rate of 500±50 mm/minute. After three times of testing, the tear strength was calculated based on the average of the three measured values (unit: kgf/cm).

6. Compression Set

According to the method B ($C_B$) of the standard D395 established by ASTM, the sample was cut into a round specimen with a diameter of 29.0±0.5 mm. A compression set tester (Brand: Gotech Testing Machines Inc.; Model: GT-7049) and the specimen were placed in an environment at 23±2° C. under a humidity of 50±10% for at least 3 hours before testing. Following that, the specimen was placed on the space bar and compressed to at least half of its thickness at 23±2° C. for 22 hours. The thickness of the specimen was measured after 30 minutes of releasing the compression. Each specimen was measured for at least two times, and the compression set was calculated based on the average of the two measured values. The compression set is calculated by the formula below (unit: %):

$C_B = [(t_o - t_i)/(t_o - t_n)] \times 100\%$;

$C_B$=compression set;
$t_o$=original thickness of the specimen;
$t_i$=final thickness of the specimen;
$t_n$=thickness of the space bar used.

7. Rebound Resilience

According to the standard D2632-2001 (2008) established by ASTM, the sample was cut into three specimens with a thickness of 12.5±5 mm. The lateral dimensions of the specimen shall be sufficient to permit measurements at least 14 mm from any edge. Each specimen was measured under a vertical rebound resilience tester (Brand: Gotech Testing Machines Inc.; Model: GT-7042-V1) at 23±2° C. The 28 grams plunger of the vertical rebound resilience tester was released from a height of 40 cm over the specimens, and the first rebound height of the plunger after hitting each specimen was recorded. Each specimen was measured for six times to obtain six rebound height values, and the fourth to the sixth rebound height values were averaged and then divided by the releasing height of the plunger to represent the rebound height of each specimen (unit: %).

8. Color Index

HunterLab ColorFlex® EZ was used to measure the whiteness, the yellowness and the brightness of the foamed elastomer without skin layer for three times, and the measured results were averaged to obtain average whiteness (WI), average yellowness (YI) and average brightness (L*).

Test Example 6: Auxiliary Crosslinking Property of the Metallic Acrylate Composition The zinc acrylate composition of Example 2 and Comparative Example 1 were adopted for Test Example 6. The resin composition sample for testing was made according to the recipe and procedure as follows. With the usage of cis-polybutadiene rubber (Trade mark: BR40; and purchased from CHI MEI CORPORATION) representing 100 wt %, the usage of the metallic acrylate composition was 29 wt %, the usage of the zinc oxide was 18 wt % and the usage of the dicumyl peroxide (DCP) was 1.5 wt %. Afterward, foresaid ingredients were placed into a Brabender mixer for mixing and stirring at a temperature ranging from 45° C. to 65° C. to obtain a mixture. Then, 6 grams of the mixture was put into a vulcameter (Brand: EKTRON TEK CO., LTD.; Model: EKT-2000S) for curing curve analysis with controlling the parameter as 170° C./10 minutes/0.5° swing angle. During the curing curve analysis, the minimum torque ($M_L$), the maximum torque ($M_H$), the scorch time (Ts2) and the curing time (Tc90) were listed in Table 5.

TABLE 5 the results of the curing curve analysis of the resin composition samples with Example 2 and Comparative Example 1 as crosslinking coagent.

|  | Resin composition sample 1 | Resin composition sample 2 |
|---|---|---|
| Crosslinking coagent | Example 2 | Comparative Example 1 |
| Minimum torque, $M_L$ (dN-m) | 2.31 | 2.31 |
| Maximum torque, $M_H$ (dN-m) | 149.6 | 149.8 |
| Scorch time, Ts2 (min) | 0.12 | 0.12 |
| Curing time, Tc90 (min) | 0.36 | 0.33 |

According to the results of Table 5, even containing graphene as the thermally conductive powder, the zinc acrylate composition of Example 2 did not affect the curing of the resin composition sample, representing that the zinc acrylate composition of Example 2 also had auxiliary crosslinking property.

Examples 11 to 21: Resin Composition

The components of the following examples of resin compositions comprised a copolymer (A), an unsaturated aliphatic polyolefin (B), an organic peroxide (C), a metallic acrylate composition (D), an auxiliary agent (E), and a foaming agent (F). Besides, foresaid resin compositions could further comprise a filler (G).

Specifically, the copolymer (A) was ethylene/vinyl acetate copolymer (A1) (Trade mark: EVATHENE UE-634; and purchased from USI).

The unsaturated aliphatic polyolefin (B) was selected from the group consisting of: ethylene propylene diene monomer rubber (B1) (Trade mark: Nordel IP 4570; and purchased from DOW), cis-polybutadiene rubber (B2)

(Trade mark: BR40; and purchased from CHI MEI CORPORATION), and any combination thereof.

The organic peroxide (C) was dicumyl peroxide (C1) (Trade mark: ACEOX DCP; and purchased from ACE Chemical Corp.).

The metallic acrylate composition (D) was foresaid metallic acrylate compositions of Examples 1 to 10.

The auxiliary agent (E) was selected from the group consisting of: stearic acid (E1), zinc stearate (E2), zinc oxide (E3), and any combination thereof.

The foaming agent (F) was azodicarbonamide (Trade mark: ACEOX AC3000; and purchased from ACE Chemical Corp.).

Comparative Examples 3 to 6 and Control Example 1: Resin Composition

The preparation methods of the resin compositions of Comparative Examples 3 to 6 and Control Example 1 were similar to Examples 11 to 21, and the main differences were that the resin compositions of Comparative Examples 3 to 6 were added with the metallic acrylate compositions of Comparative Examples 1 and 2 as the metallic acrylate composition (D); and the resin composition of Control Example 1 did not contain the metallic acrylate composition (D). The usages of the components of the resin compositions of Comparative Examples 3 to 6 and Control Example 1 were also listed in Table 6.

TABLE 6 the usages of the components of the resin compositions of Examples 11 to 21 (E11 to E21), Comparative Examples 3 to 6 (C3 to C6) and Control Example 1 (Ctrl 1).

| | | Components and the usage expressed in parts by weight | | | | | | |
|---|---|---|---|---|---|---|---|---|
| Resin composition | Metallic acrylate composition | Copolymer (A1) | Unsaturated aliphatic polyolefin (B) | | Organic peroxide (C1) | Metallic acrylate composition (D) | Foaming agent (F1) | Filler (G1) |
| | | | (B1) | (B2) | | | | |
| E11 | E1 | 100 | 100 | 0 | 0.5 | 4.34 | 6.70 | 0 |
| E12 | E2 | 100 | 100 | 0 | 0.5 | 4.34 | 6.70 | 0 |
| E13 | E3 | 100 | 100 | 0 | 0.5 | 4.34 | 6.70 | 0 |
| E14 | E5 | 100 | 100 | 0 | 0.5 | 4.34 | 6.70 | 0 |
| E15 | E9 | 100 | 100 | 0 | 0.5 | 4.34 | 6.70 | 0 |
| E16 | E8 | 100 | 100 | 0 | 0.5 | 4.34 | 6.70 | 0 |
| E17 | E2 | 100 | 100 | 0 | 0.5 | 4.34 | 6.70 | 30 |
| E18 | E2 | 100 | 0 | 100 | 0.5 | 4.34 | 6.70 | 0 |
| E19 | E1 | 100 | 100 | 0 | 0.5 | 4.34 | 0 | 0 |
| E20 | E3 | 100 | 100 | 0 | 0.5 | 4.34 | 0 | 0 |
| E21 | E10 | 100 | 100 | 0 | 0.5 | 4.34 | 0 | 0 |
| C3 | C1 | 100 | 100 | 0 | 0.5 | 4.34 | 6.70 | 0 |
| C4 | C1 | 100 | 0 | 100 | 0.5 | 4.34 | 6.70 | 30 |
| C5 | C1 | 100 | 100 | 0 | 0.5 | 4.34 | 0 | 0 |
| C6 | C2 | 100 | 100 | 0 | 0.5 | 4.34 | 0 | 0 |
| Ctrl. 1 | — | 100 | 100 | 0 | 0.5 | 0 | 6.70 | 0 |

The filler (G) was calcium carbonate.

In the process of preparing the resin composition, the copolymer (A), the unsaturated aliphatic polyolefin (B), the metallic acrylate composition (D), and auxiliary agent (E) were mixed at 60° C. to 100° C. in a kneader (Brand: KNEADER; Model: KD-3-20) at a rotational speed of 40 rpm for 5 minutes. Following that, the organic peroxide (C) and the foaming agent (F) were added and mixed with foresaid components for another 5 minutes at 80° C. to 100° C., and then formed a resin composition.

In resin compositions of Examples 11 to 21, the usage of the unsaturated aliphatic polyolefin (B) was 100 parts by weight (i.e., 100 phr) and the usage of the other components was expressed in parts by weight relative to the usage of the unsaturated aliphatic polyolefin (B). For the usage of the auxiliary agent (E) in the resin composition, the usage of the stearic acid (E1), the zinc stearate (E2) and the zinc oxide (E3) were constant as 0.88 parts by weight, 1.36 parts by weight and 2.24 parts by weight, respectively. Except the auxiliary agent (E), the usage of the rest of the components of resin compositions of Examples 11 to 21 were listed in Table 6. By means of controlling the components of the resin composition, the effects of the metallic acrylate composition (D) on the properties of the resin composition could be explored.

Examples 19A to 21A and Comparative Examples 5A and 6A: Polyolefin Elastomer

The resin compositions of Examples 19 to 21 and Comparative Examples 5 and 6, representing the resin composition without the foaming agent, were adopted and rolled into sheets by a two-roll mill mixer (Brand: HSU FENG IRON FACTORY COMPANY LIMITED; Model: HF-2RM).

After that, 32 grams of foresaid sheets were put into the center of a metal mold with thickness of 2 mm, length of 120 mm and width of 120 mm, and were kept at 165±5° C. and under 100±5 kgf/cm² for 10 minutes to prepare the polyolefin elastomers of Examples 19A to 21A and Comparative Examples 5A and 6A.

Examples 11A to 18A and Comparative Examples 3A to 4A and Control Example 1A: Foamed Elastomer The resin compositions of Examples 11 to 18 and Comparative Examples 3 and 4 and Control Example 1, representing the resin composition with the foaming agent, were adopted and cut into 3 mm-length pellets by a granulator (Brand: Kneader Machinery Co., Ltd.; Model: KD-FR-50)

or rolled into sheets by a two-roll mill mixer (Brand: HSU FENG IRON FACTORY COMPANY LIMITED; Model: HF-2RM).

After that, 42 grams of foresaid pellets or sheets were put into a metal mold with thickness of 8 mm, length of 120 mm and width of 50 mm, and were kept at 165±5° C. and under 160±10 kgf/cm² for 10 minutes to 20 minutes to prepare the foamed elastomers of Examples 11A to 18A, Comparative Examples 3A and 4A and Control Example 1A.

The properties of the polyolefin elastomers of Examples 19A to 21A and Comparative Examples 5A and 6A, and the foamed elastomers of Examples 11A to 18A, Comparative Examples 3A and 4A and Control Example 1A were measured according to the foresaid methods. The results of the hardness (abbreviated as Hard. in Table 7), the density (abbreviated as Den. in Table 7), the ultimate tensile strength (abbreviated as UTS. in Table 7), the elongation at break (abbreviated as EB. in Table 7), the tear strength (abbreviated as TS in Table 7), the compression set (abbreviated as CS. in Table 7), the rebound resilience (abbreviated as RR. in Table 7) and the color index were listed in Table 7.

Besides, for evaluation of the effects of the thermally conductive powder in the metallic acrylate composition on the properties of the resin composition, the content of the thermally conductive powder in the resin composition was also listed in Table 7 (the content of the thermally conductive powder in the resin composition was abbreviated as Content of the thermally conductive powder [resin] in Table 7). The calculation of the content of the thermally conductive powder in the resin composition was the weight of the metallic acrylate composition (D) multiplied with the content of the thermally conductive power listed in Table 1, and then divided by the total weight of the resin composition. The unit of the content of the thermally conductive powder in the resin composition was expressed in ppm.

TABLE 7 the properties of the polyolefin elastomers of Examples 19A to 21A (E19A to E21A) and Comparative Examples 5A and 6A (C5A and C6A), and the foamed elastomers of Examples 11A to 18A (E11A to E18A), Comparative Examples 3A and 4A (C3A and C4A) and Control Example 1A (Ctrl. 1A).

| Group | Content of the thermally conductive powder [resin] (ppm) | Hard. (shore C) | Den. (g/cm³) | UTS. (kgf/cm²) | EB. (%) | TS. (kgf/cm) | CS. (%) | RR. (%) | Color index WI YI L* |
|---|---|---|---|---|---|---|---|---|---|
| E11A | 73.7 | 38 | 0.1591 | 18.6 | 429 | 10.3 | 34.1 | 63 | 43.4 10.4 83.7 |
| E12A | 155 | 40 | 0.1718 | 20.6 | 461 | 11.4 | 34.4 | 66 | 43.1 6.90 78.4 |
| E13A | 309 | 39 | 0.1631 | 18.1 | 446 | 10.6 | 38.8 | 65 | 47.3 5.37 78.4 |
| E14A | 1597 | 39 | 0.1654 | 18.6 | 497 | 9.7 | 37.7 | 63 | 26.7 1.61 58.1 |
| E15A | 4179 | 41 | 0.1704 | 19.8 | 476 | 10.4 | 36 | 62 | 25.2 −1.02 49.0 |
| E16A | 151 | 43 | 0.1836 | 19.8 | 454 | 10.4 | 31 | 66 | 49.6 8.17 84.2 |
| E17A | 136 | 44 | 0.1969 | 20.1 | 520 | 10.2 | 35.2 | 67 | 44.6 8.63 81.8 |
| E18A | 155 | 45 | 0.2110 | 13.5 | 300 | 8.2 | 13.5 | 58 | 46.0 8.96 81.7 |
| E19A | 160 | 64 | 0.923 | 122.1 | 677 | 35.6 | 16.2 | 62 | 65.9 −15.6 56.6 |
| E20A | 321 | 65 | 0.921 | 135.7 | 605 | 35.4 | 18.1 | 61 | 63.4 −16.8 52.3 |
| E21A | 160 | 64 | 0.919 | 133.9 | 742 | 39.0 | 26.9 | 57 | 65.8 −14.1 59.4 |
| C3A | 0 | 40 | 0.1738 | 16.6 | 411 | 9.58 | 35.2 | 67 | 31.8 16.6 85.7 |
| C4A | 0 | 45 | 0.2151 | 13.4 | 298 | 7.5 | 15.1 | 58 | 34.3 12.0 84.2 |
| C5A | 0 | 64 | 0.920 | 105.8 | 598 | 34.9 | 18.4 | 51 | 72.7 −3.56 81.6 |

TABLE 7-continued the properties of the polyolefin elastomers of Examples 19A to 21A (E19A to E21A) and Comparative Examples 5A and 6A (C5A and C6A), and the foamed elastomers of Examples 11A to 18A (E11A to E18A), Comparative Examples 3A and 4A (C3A and C4A) and Control Example 1A (Ctrl. 1A).

| Group | Content of the thermally conductive powder [resin] (ppm) | Hard. (shore C) | Den. (g/cm$^3$) | UTS. (kgf/cm$^2$) | EB. (%) | TS. (kgf/cm) | CS. (%) | RR. (%) | Color index WI YI L* |
|---|---|---|---|---|---|---|---|---|---|
| C6A | 0 | 63 | 0.916 | 111.8 | 691 | 38.1 | 26.1 | 57 | 80.4 −4.24 85.3 |
| Ctrl. 1A | 0 | 35 | 0.1434 | 10.87 | 578 | 6.58 | 53.8 | 62 | 74.2 5.74 94.1 |

For the groups of Examples 11A to 17A and Comparative Examples 3A, which adopted ethylene propylene diene monomer rubber (B1) as the unsaturated aliphatic polyolefin (B) and contained foaming agent, the components of said groups were the same except for the metallic acrylate composition. Therefore, the differences of results among said groups could be thought of as the differences on the ingredient and usage of the metallic acrylate composition. For evaluation of the mechanical strength, such as the ultimate tensile strength and the tear strength, of the foamed elastomers, please refer to the results of the ultimate tensile strength and the tear strength of the foamed elastomers of Examples 11A to 16A and Comparative Example 3A in Table 7. In comparison to the ultimate tensile strength (16.6 kgf/cm$^2$) and the tear strength (9.58 kgf/cm) of Comparative Example 3A, the ultimate tensile strength and the tear strength of Examples 11A to 16A were obviously enhanced. That is, because the foamed elastomers of Examples 11A to Examples 16A contained the metallic acrylate composition with the thermally conductive powder, the results demonstrated enhancement of the ultimate tensile strength and the tear strength, representing the effects of enhancing the mechanical strength. Besides, further referring to Example 17A, the components of Example 17A additionally contained calcium carbonate as the filler, and the ultimate tensile strength and the tear strength were still better than Comparative Example 3A according to the results in Table 7.

For the groups of Example 18A and Comparative Example 4A, which adopted cis-polybutadiene rubber (B2) as the unsaturated aliphatic polyolefin (B) and contained foaming agent, the components of said groups were the same except for the metallic acrylate composition. Therefore, the differences of results among said groups could be thought of as the differences on the ingredient and usage of the metallic acrylate composition. According to the results in Table 7, in comparison to the ultimate tensile strength (13.4 kgf/cm$^2$) and the tear strength (7.5 kgf/cm) of Comparative Example 4A, the ultimate tensile strength and the tear strength of Example 18A were 13.5 kgf/cm$^2$ and 8.2 kgf/cm, respectively, also showing enhanced mechanical strength. Moreover, the compression set of Example 18A was 13.5% and still better than Comparative Example 4A (15.1%).

In addition, please refer to the results of color index of Examples 11A to 13A. In general, when graphene, flake graphite or the combination thereof was added into the resin composition as the thermally conductive powder, the whiteness (WI) of the resin composition were expected to decrease. However, according to the results of the WI of Examples 11A to 13A and Comparative Example 3A, the WI unexpectedly increased when the content of the thermally conductive powder in the resin composition was controlled within a specific range. Furthermore, according to the results of yellowness (YI) and brightness (L*) of Examples 11A to 13A and Comparative Example 3A, controlling of the content of the thermally conductive powder in the resin composition within a specific range also had effects of lowering the yellowness and producing matte texture on the surface.

On the other hand, for the groups of Examples 19A to 21A and Comparative Examples 5A and 6A, which also adopted ethylene propylene diene monomer rubber (B1) as the unsaturated aliphatic polyolefin (B) but did not contain foaming agent, the components of said groups were the same except for the metallic acrylate composition. Therefore, the differences of results among said groups could be thought of as the differences on the ingredient and usage of the metallic acrylate composition. According to the results of Examples 19A to 21A and Comparative Examples 5A and 6A in Table 7, in comparison to Comparative Examples 5A and 6A, containing the metallic acrylate composition without the thermally conductive powder, the polyolefin elastomers of Examples 19A to 21A had obvious enhancement on the ultimate tensile strength. That is, the metallic acrylate composition with the thermally conductive powder could be applied to unfoamed resin composition and still had effects of enhancing the mechanical strength. Besides, for the results of the ultimate tensile strength of Examples 19A, 20A and Comparative Example 5A measured at three different positions, in comparison to Comparative Example 5A (106.8 kgf/cm$^2$, 83.6 kgf/cm$^2$ and 127.1 kgf/cm$^2$ for three different positions respectively; and 105 kgf/cm$^2$ in average), Example 19A (126.2 kgf/cm$^2$, 116.7 kgf/cm$^2$ and 123.4 kgf/cm$^2$ for three different positions respectively; and 122.1 kgf/cm$^2$ in average) and Example 20A (137.1 kgf/cm$^2$, 137.6 kgf/cm$^2$ and 132.4 kgf/cm$^2$ for three different positions respectively; and 135.7 kgf/cm$^2$ in average) had higher consistency of the ultimate tensile strength at three different positions. Therefore, the metallic acrylate composition with the thermally conductive powder also had effect of enhancing the mechanical strength evenly.

Test Example 7: Uniformity of Cell Dispersion in the Foamed Elastomer

FE-SEM (Model: JOEL JSM-6700F) was used to observe the foamed elastomers of Example 12A and Comparative Example 3A under 100-fold amplification, and then microscope images were acquired and shown in FIGS. 2A to 2C and FIGS. 2D to 2F. Specifically, FIGS. 2A to 2C were respectively the top, the middle and the bottom of the foamed elastomer of Example 12A; and FIGS. 2D to 2F were respectively the top, the middle and the bottom of the foamed elastomer of Comparative Example 3A.

Figure 2A:
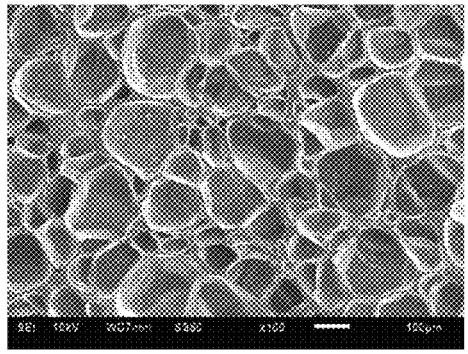
FIG. 2A to 2C respectively are photographs taken with FE-SEM of the top, the middle and the bottom of the foamed elastomer of Example 12A.
Figure 2D:
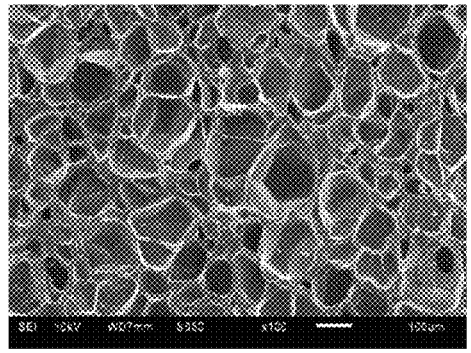
FIG. 2D to 2F respectively are photographs taken with FE-SEM of the top, the middle and the bottom of the foamed elastomer of Comparative Example 3A.
Figure 2B:
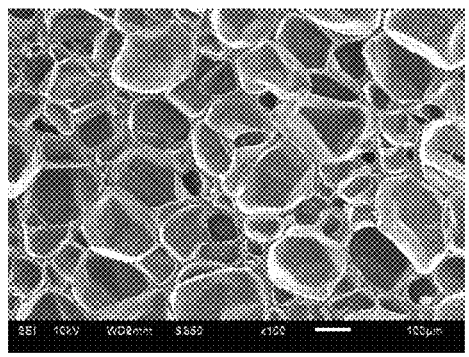
Figure 2E:
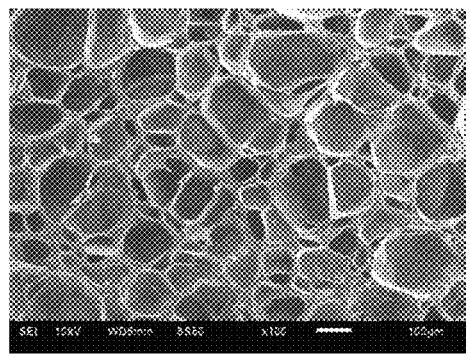
Figure 2C:
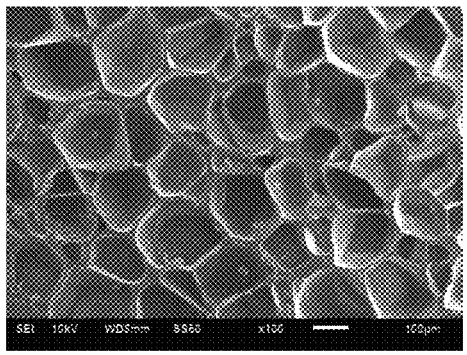
Figure 2F:
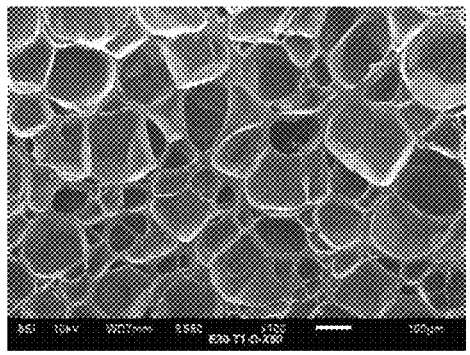

According to FIGS. 2A to 2C, the number and distribution of cells of the top, the middle and the bottom of the foamed elastomer of Example 12A were close to each other, while according to FIGS. 2D to 2F, the number and distribution of cells of the top, the middle and the bottom of the foamed elastomer of Comparative Example 3A had obvious differences. Especially, the number of cells in FIG. 2D was obviously more than that in FIG. 2F. Accordingly, by adding the metallic acrylate composition with graphene or flake graphite into the resin composition and then further preparing the foamed elastomer, the uniformity of cell dispersion in the foamed elastomer was actually improved.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A metallic acrylate composition prepared by a method comprising steps of:
    step (a): reacting an acrylic acid, a divalent metal oxide and a thermally conductive powder in a nonpolar solvent at a temperature ranging from 30° C. to 100° C. to obtain a first mixture; and
    step (b): removing the nonpolar solvent of the first mixture to obtain the metallic acrylate composition;
    wherein the metallic acrylate composition comprises:
    a metallic acrylate having a structure represented by Formula (I):

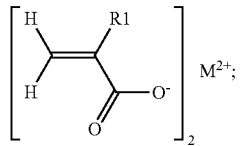

Formula (I)

wherein in Formula (I), $M^{2+}$ is zinc ion, magnesium ion or calcium ion and R1 is a hydrogen group or a saturated alkyl group having 1 to 6 carbon atoms; and
    the thermally conductive powder including a graphene, a flake graphite or a combination thereof, and a content of the thermally conductive powder ranges from 0.3 wt % to 25 wt % based on the total weight of the metallic acrylate composition;
    wherein the graphene includes a reduced graphene oxide having carbon content more than 40% and 3 to 30 layers; and the flake graphite includes a flake graphite with carbon content more than 95%.

2. The metallic acrylate composition as claimed in claim 1, wherein the content of the thermally conductive powder ranges from 0.3 wt % to 8 wt % based on the total weight of the metallic acrylate composition.

3. The metallic acrylate composition as claimed in claim 2, wherein the content of the thermally conductive powder ranges from 0.3 wt % to 2 wt % based on the total weight of the metallic acrylate composition.

4. The metallic acrylate composition as claimed in claim 1, wherein the graphene includes a reduced graphene oxide having carbon content more than 60% and 3 to 20 layers; and the flake graphite includes a flake graphite with carbon content more than 98%.

5. A method of preparing the metallic acrylate composition as claimed in claim 1, comprising the step (a) and the step (b).

6. The method as claimed in claim 5, wherein the step (a) further comprises:
    step (a1): mixing the acrylic acid and the thermally conductive powder to obtain a second mixture; and
    step (a2): reacting the second mixture and the divalent metal oxide in the nonpolar solvent at the temperature ranging from 30° C. to 100° C. to obtain the first mixture.

7. The method as claimed in claim 5, wherein the first mixture further comprises an additive and the additive includes an antioxidant, a retarder, a thermal stabilizer, a lubricant, a surfactant or a combination thereof;
    and a content of the additive ranges from 0.02 wt % to 10 wt % based on the total weight of the metallic acrylate composition.

8. The method as claimed in claim 5, wherein a molar ratio of the acrylic acid and the divalent metal oxide is 1.4:1 to 2.1:1.

9. The method as claimed in claim 5, wherein the nonpolar solvent includes benzene, toluene, xylene, cyclohexane, hexane, heptane or octane.

10. A resin composition comprising an unsaturated aliphatic polyolefin and the metallic acrylate composition as claimed in claim 1.

11. The resin composition as claimed in claim 10, wherein an amount of the metallic acrylate composition ranges from 0.1 parts by weight to 30 parts by weight per 100 parts by weight of the unsaturated aliphatic polyolefin.

12. The resin composition as claimed in claim 10, wherein the unsaturated aliphatic polyolefin is selected from the group consisting of: an ethylene propylene diene monomer rubber, a polybutadiene rubber, a butyl rubber, a natural rubber, an isoprene rubber, and a combination thereof.

13. The resin composition as claimed in claim 10, wherein the resin composition further comprises a copolymer and the copolymer includes an ethylene copolymer, an olefin block copolymer, or a combination thereof.

14. The resin composition as claimed in claim 13, wherein the ethylene copolymer is selected from the group consisting of: an ethylene/vinyl acetate copolymer, an ethylene/octene copolymer, a polyethylene, an ethylene/alpha-olefin copolymer, an ethylene/alpha-olefin non-conjugated diene copolymer, an ethylene/acrylic copolymer, an ethylene/methyl acrylic copolymer, an ethylene/methyl acrylate copolymer, an ethylene/methyl methacrylate copolymer, an ethylene/ethyl acrylate copolymer, an ethylene/ethyl methacrylate copolymer, an ethylene/butyl acrylate copolymer, an ethylene/butyl methacrylate copolymer, and a combination thereof.

15. The resin composition as claimed in claim 10, wherein the resin composition further comprises an organic peroxide and the organic peroxide includes an alkyl hydroperoxide, a dialkyl hydroperoxide, an aromatic hydroperoxide, peroxyesters, diperoxyketals, a diacyl peroxide, or peroxydicarbonates.

16. The resin composition as claimed in claim 10, wherein the resin composition further comprises a foaming agent and the foaming agent includes an azo compound, a nitroso compound, or a sulfonyl hydrazine compound.

17. A polyolefin elastomer prepared from the resin composition as claimed in claim 10.

18. A foamed elastomer prepared from the resin composition as claimed in claim 10.

19. The foamed elastomer as claimed in claim 18, wherein the foamed elastomer is used as architectural materials, vehicle materials, damping materials, cushioning materials, packing materials, sport pad materials, or shoe materials.

* * * * *